No. 792,570. PATENTED JUNE 13, 1905.
A. F. CHERNEY.
BAKE OVEN.
APPLICATION FILED MAR. 23, 1903.

3 SHEETS—SHEET 1.

Witnesses
Samuel W. Banning
Walker Banning

Inventor
Anton F. Cherney
By Banning & Banning
Attys

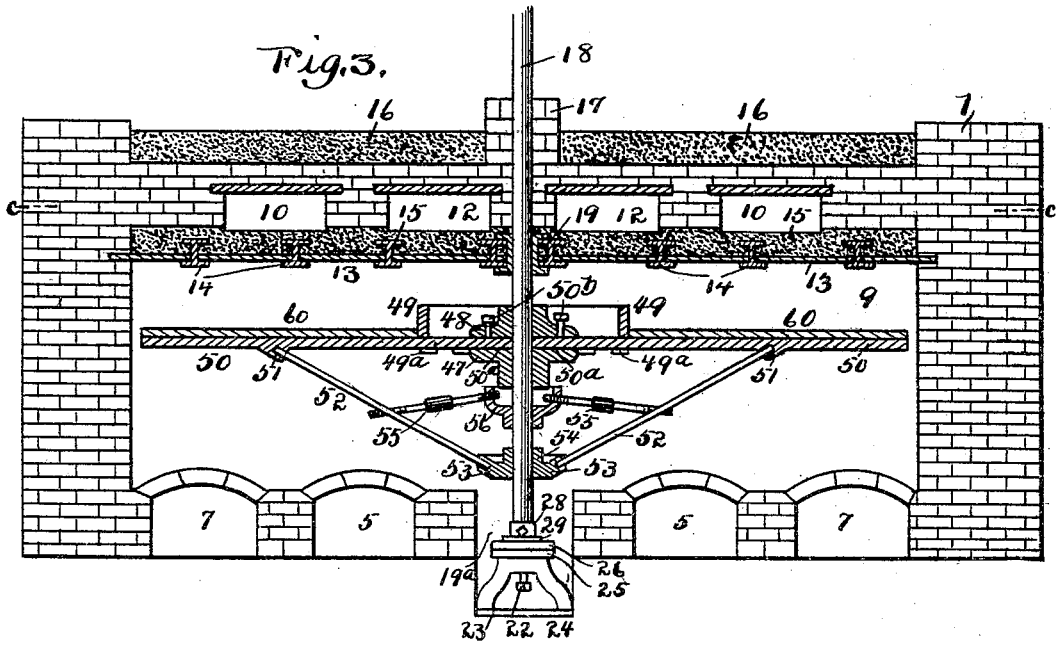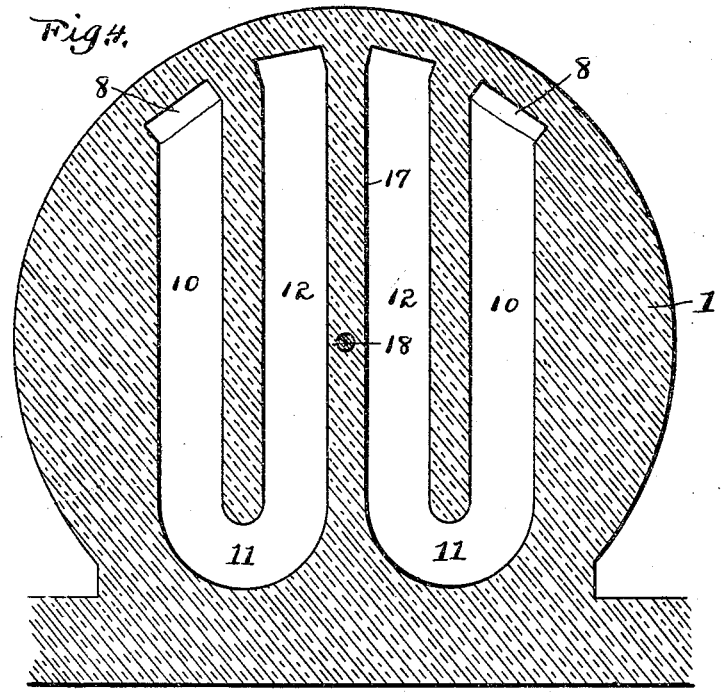

No. 792,570. PATENTED JUNE 13, 1905.
A. F. CHERNEY.
BAKE OVEN.
APPLICATION FILED MAR. 23, 1903.
3 SHEETS—SHEET 3.
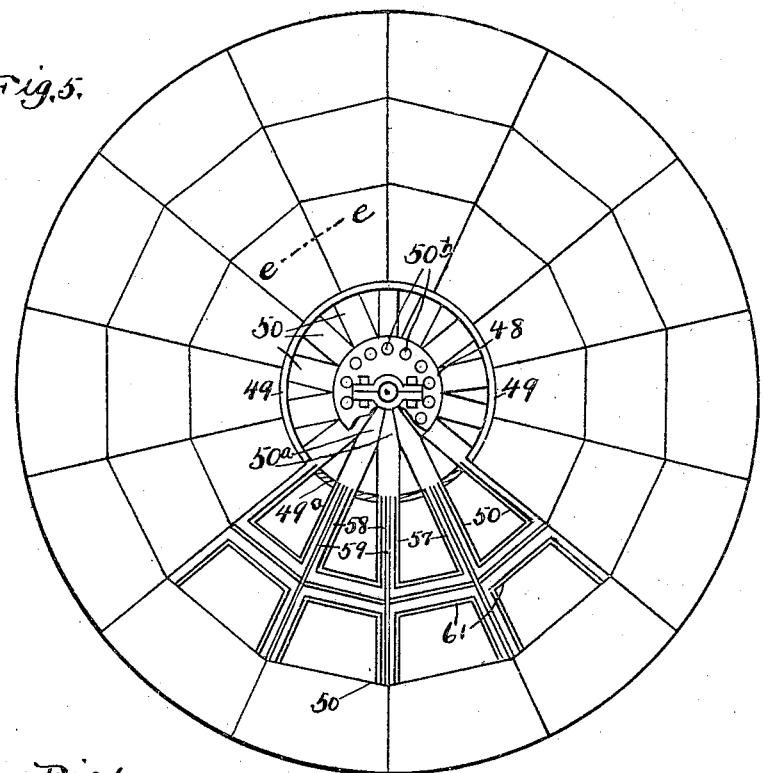
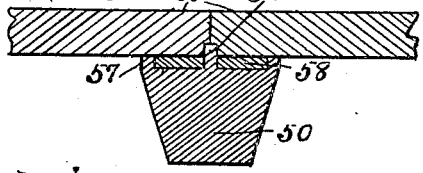
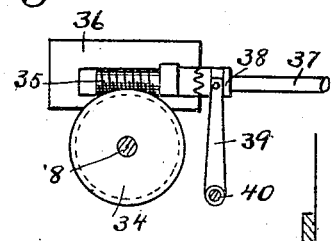
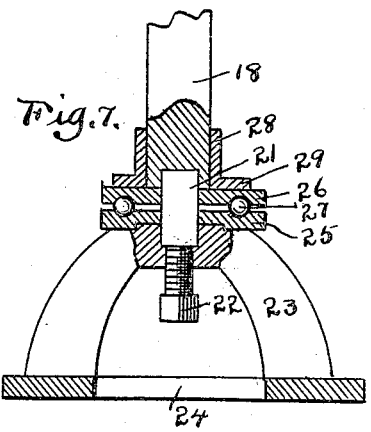
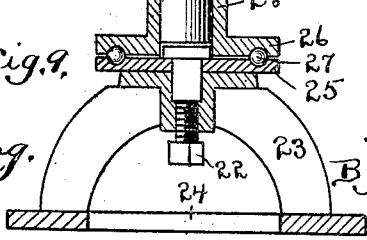
Witnesses
Samuel W. Banning
Walker Banning
Inventor
Anton F. Cherney
By Banning & Banning
Attys.

No. 792,570. Patented June 13, 1905.

UNITED STATES PATENT OFFICE.

ANTON F. CHERNEY, OF CHICAGO, ILLINOIS, ASSIGNOR TO H. H. KOHLSAAT & COMPANY, OF CHICAGO, ILLINOIS, A CORPORATION OF ILLINOIS.

BAKE-OVEN.

SPECIFICATION forming part of Letters Patent No. 792,570, dated June 13, 1905.

Application filed March 23, 1903. Serial No. 149,153.

*To all whom it may concern:*

Be it known that I, ANTON F. CHERNEY, a citizen of the United States, and a resident of Chicago, in the county of Cook and State of Illinois, have invented certain new and useful Improvements in Bake-Ovens, of which the following is a specification.

This invention relates to certain improvements in bake-ovens, and has for its object to provide an oven of an improved and simplified construction which shall afford a maximum capacity for baking purposes with a minimum of fuel consumption and in which there is for practical purposes an even or uniform distribution of heat, so that the baking is effected in a thorough and uniform manner and the removal of the loaves or other articles from the oven and their insertion therein are accomplished in a ready and easy manner.

The invention consists in certain novel features of the construction and combinations and arrangements of the several parts of the improved bake-oven whereby certain important advantages are attained and the device is made simpler, cheaper, and otherwise better adapted and more convenient for use, all as will be hereinafter fully set forth.

The novel features of the invention will be carefully defined in the claims.

Figure 1:
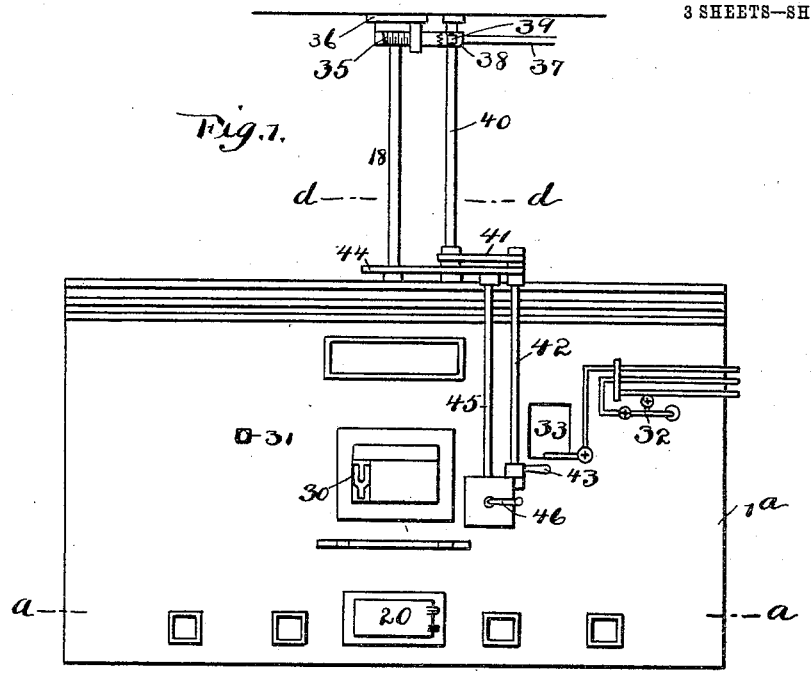
Figure 2:
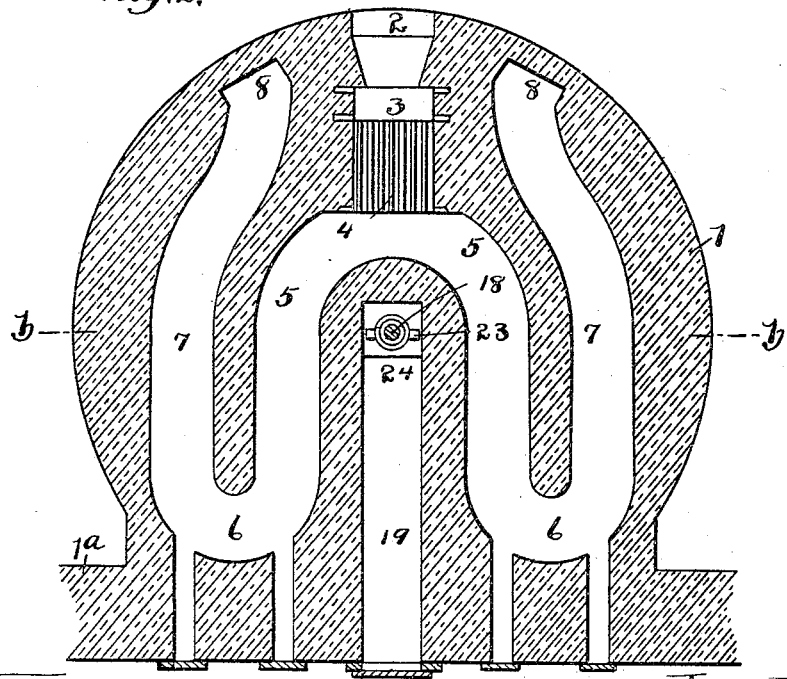

In the accompanying drawings, which serve to illustrate my improvements, Figure 1 is an elevation showing a bake-oven constructed according to my invention; and Fig. 2 is a section taken transversely and horizontally through the same in the plane indicated by the line *a a* in Fig. 1, being taken through the flues and fire-chamber at the lower part of the oven. Fig. 3 is a sectional view taken vertically through the improved oven in the plane indicated by line *b b* in Fig. 2. Fig. 4 is a transverse section similar to Fig. 2, but taken horizontally through the improved bake-oven in the plane indicated by line *c c* in Fig. 3, being taken through the smoke-flues at the upper part of the improved oven. Fig. 5 is a view showing in plan the rotating plane or part for supporting the loaves or other articles in the baking-chamber, part of the surface of the same being broken out to show the underlying parts. Fig. 6 is a sectional detail view drawn to an enlarged scale and taken through one of the supporting-arms of the rotatory plane or part in the plane indicated by the line *e e* in Fig. 5. Fig. 7 is a sectional detail view drawn to an enlarged scale and showing the step-bearing at the base of the shaft on which said rotatory plane or part is carried. Fig. 8 is an enlarged detail view showing the gearing for driving the rotatory plane or part, being an inverted sectional plan view taken in the plane indicated by line *d d* in Fig. 1; and Fig. 9, an enlarged sectional detail of a modified form of step-bearing.

As clearly shown in the drawings, the improved oven is of the rotary class or type and is constructed with a circular wall 1, the front portion of which is, especially where a plurality of the ovens are joined in a battery, merged in a straight front wall 1ª, wherein the doors of the various chambers and flues are set, as shown in Fig. 1. 2 indicates the charging-door of the fire-box, this being arranged at the back of the circular part of the improved bake-oven and opposite to said straight front wall, and 3 indicates a dead-plate, and 4 the grate-bars in the said fire-box.

5 5 indicate flues or passages for the products of combustion from the fire-box, and these are curved or bent away from each other toward opposite sides of the center of the circular body of the oven, being separated from each other by a thickened partition-wall, as clearly seen in Fig. 2, and being extended forward or toward the front wall of the oven upon opposite sides of the said partition-wall. Near the front of the oven these flues 5 5 are curved or bent outwardly or away from each other and are connected with other similar flues or passages 7, which extend outside of, in the same plane with, and are substantially parallel with the said flues or passages 5.

6 6 indicate the bends or curves which connect the forward ends of the flues 5 and 7.

The rear ends of the outer flues or passages 7 7 are curved or bent slightly toward each other upon opposite sides of the fire-box and are extended into the rear part of the circular wall of the oven, being made of as great length as possible in order that as much as possible of the heat from the products of combustion passing through the flues may be absorbed by the walls thereof, so as to give increased efficiency to the oven. The rear ends of said outer flues or passages 7 7 communicate with upwardly-extended flues 8 8, formed in the outer circular wall of the oven upon opposite sides of the charging-door 2 and extended up past the baking-chamber 9, which is formed within the body of the oven above the plane of the lower flues 5 and 7. The said lower flues 5 and 7 are tightly walled or arched over to prevent the escape of gases from them into the baking-chamber 9.

Above the baking-chamber the upwardly-extended flues 8 8 are adapted for communication with other upper flues or passages 10 10 at opposite sides of the body of the oven, these flues 10 10 being arranged as shown in Figs. 3 and 4 and extended from the rear to the front of the improved oven and being formed with bent or curved forward ends 11 11, which are extended toward each other and which communicate with other inner flues 12 12, separated from said outer flues 11 and also from themselves by partitions, as clearly shown in said figures. The said inner flues 12 12 lie in the same plane with and are parallel to the flues 11 11, and at their rear ends said inner flues are adapted for communication with a smoke-outlet of any preferred kind.

The upper flues 11 and 12 above the baking-chamber 9 are separated from said baking-chamber by the roof thereof, which is formed of tiles 13, supported upon metal beams 14 in a well-known way and overlaid with concrete or cement, as shown at 15, to prevent the downward passage of gases from said upper flues into the baking-chamber.

17 indicates the partition-wall which divides the inner flues 12 12 from each other, and this partition-wall is extended above the top of the oven-body, as clearly shown in Fig. 3, and a shaft 18, arranged axially with respect to the circular body of the oven, is extended down through it. This raised wall 17 serves to prevent the entry of particles of grit or the like to the bearings of said shaft, the top of the oven being covered over with a layer of sand in order to increase its heat-retaining qualities, which sand but for the presence of said raised wall 17 or its equivalent would be drawn down around the shaft into its bearings.

16 indicates the layer of sand or the like upon the top of the oven.

The shaft 18 has an upper bearing 19, formed of a flanged collar, the flanges of which are rested upon two closely-adjacent metal beams 14 at the central part of the roof of the baking-chamber, as shown in Fig. 3. The lower end of said shaft is extended down within the partition between the flues 5 5 at the base of the oven and stands within a chamber 19ª, formed in said partition, said chamber being in the nature of a passage which is extended to the front wall of the oven and has a door 20, as shown in Figs. 1 and 2, through which access may be had thereto.

The lower end of the shaft 18 is formed with a central bore or recess in which is fitted a circular stud 21, as shown in Fig. 7, which stud is supported upon the upper end of a screw 22, held in a boot or stirrup 23, formed of upwardly-extended arms integrally produced upon a plate or anchor 24, the said boot or stirrup 23 being also provided at its upper part with a bearing for the reception of the lower end of said stud 21. The arms of the stirrup 23 are spaced apart to afford access to the head of the screw 22, said head being upon the under side of the upper part of the stirrup.

25 indicates a bearing disk or plate held in a horizontal position upon the boot or stirrup 23, and 26 indicates a similar plate or part held upon a collar 28, shrunk or otherwise held upon the lower end of shaft 18 and provided with a flanged lower end 29, which rests on and is secured to the top of plate or disk 26. The two bearing disks or plates 25 and 26 have concentric and corresponding annular grooves or raceways formed in their adjacent surfaces, in which are received balls 27.

30 indicates the door of the baking-chamber 9, said door being, as clearly shown in Fig. 1, formed in the straight front wall of the oven. 31 indicates a pyrometer set on said front wall for indicating the temperature in the baking-chamber, and 32 indicates an arrangement of steam-pipes for admitting steam to said chamber for service in the operation of the oven. 33 indicates an opening for a lamp, by means of which the interior of said chamber may be illuminated for inspection.

The upper end of the shaft 18 carries a worm-wheel 34, as shown in Fig. 8, and said worm-wheel is in mesh with a worm 35, held in a bearing-bracket 36, secured above the oven, a shaft 37 being provided for driving said worm from a suitable source of power, which is transmitted through a clutch member 38, slidable on shaft 37 and actuated by means of an arm 39 from a vertical shaft 40, which is extended above the top of the oven and which has at its lower end a connection 41 with a second shaft 42, journaled in bearings upon the front wall of the oven and provided near its lower end with a handle 43, by means of which it may be rocked for throwing the clutch member back and forth and into and out of driving position. The shaft 18 has also near the top of the oven a gear connection, preferably in the nature of a link belt and chain-wheels, as shown at 44, with a shaft 45, also journaled in bearings upon the front wall of the oven and adapted to be driven from a crank-handle 46. By this means it will be seen that the shaft 18 may be driven either from power or by manual means at will.

In the baking-chamber 9 and near the upper part thereof is arranged the rotatory plane or part upon which the loaves or articles to be baked are supported during the operation of the improved bake-oven, and said rotatory part or plane is set horizontally and is of circular form, being slightly less in diameter than the baking-chamber wherein it turns, so that the hot air may pass upward around its edges. The said part or plane is secured upon and rotated from the vertical shaft 18 and comprises a framework formed of radial arms or bars 50, of metal, tapered toward their outer ends, so that their weight may be lessened as much as possible consistent with their required strength, and also having their inner ends tapered, as shown at $50^a$, so that they may fit together adjacent to and around the shaft similarly to the spokes of a wagon-wheel. The tapered inner ends $50^a$ of the arms or bars 50 are fitted between two spaced collars 47 and 48, secured upon the shaft 18 one above the other, each collar being formed, as shown in Fig. 5, from two parts or sections bolted together and adapted to be secured upon the shaft when the same is in place in the oven. The upper collar 48 carries a series of set-screws $50^b$, adapted to bear on the ends $50^a$ of arms or bars 50 to hold them from disengagement with the collars.

Near the center of each arm or bar 50 and on the under side thereof is formed a socket 51, in which is engaged the upper end of a diagonal brace-bar 52, which is inclined downward and toward the shaft 18 and has its lower end seated in a socket 53 in a collar 54, secured on shaft 18 near the bottom of the chamber 9. In this way it will be seen that for the series of radial bars or arms 50 there is a corresponding series of diagonal braces 52 upon the under side of the rotatory plane or part, whereby the upper surface thereof is left free for the reception of the articles to be baked without lessening in any way the strength necessary for said arms. 55 indicates other braces oppositely threaded at their opposite ends, and these braces 55 have their outer threaded ends engaged with the central parts of the braces 52 and their inner ends engaged with a flanged collar 56 on shaft 18. The braces 55 have squares formed on them for engagement with a tool, and when they are turned they serve to draw the braces 52 toward the shaft 18, so as to lift the arms or bars 50, whereby these latter may be brought into true in case any of them should sag.

Each arm or bar 50 has in its upper surface two longitudinal channels or depressions 58 58, whereby a raised flange or fin 57 is provided along each side of each of said bars or arms, and another raised flange or fin 59 of greater height than the outer flanges is produced along the center of each bar or arm, as shown in Figs. 5 and 6. The surface of the rotatory plane or part is formed from soapstone or other suitable material, and this surface, as indicated at 60 in the drawings, is formed into a number of segments, which are fitted between the arms or bars 50, whereon they rest, and are held in place by the higher central flanges 59 on said arms or bars, which take between the segments, as shown in Fig. 6, and serve to hold the segments against slipping laterally. The channels or depressions 58 in the bars or rods 50 serve to receive cement, by means of which the segments are held down upon the framework formed of the arms or bars 50.

To brace the outer ends of the arms or bars 50 against lateral strains, transverse parts 61 are provided having ends engaged with adjacent bars or arms and extended between them, and these parts 61 are formed with depressions and flanges similarly to the bars or arms 50 to receive plaster or cement for holding the segments thereon. The segments are also by preference each divided into a number of sections, and a part 61 is extended along the joint between each two of such sections, with a flange 59 to prevent radial movement of such sections.

49 indicates an annular band or ring of metal having on its under side depending projections $49^a$, which take down between the arms or bars 50 at the inner ends thereof, so that the said ring or band is secured upon the framework of the rotatory plane and forms an upwardly-extended central flange surrounding the shaft to prevent the articles placed on said plane from being pushed too near said shaft. The soapstone covering 60 of the rotatory plane only extends to this flange, so that within said flange openings are left extending through the plane and permitting circulation of the hot air within the baking-chamber.

In the operation of the improved bake-oven a charge of fuel is first placed in the fire-box and lighted, and after it has burned sufficiently high the drafts are partially closed to prevent the fire from burning out too fast. As soon as the baking-chamber is sufficiently hot the bread or other articles to be baked are placed upon the rotatory plane or part and the shaft 18 is set in motion, either by hand or power, so that the loaves carried on the plane are exposed to the heat in the baking-chamber in a thorough and uniform way, whereby the operation of baking is greatly facilitated and the result much improved. The arrangement of the flues or passages for the products of combustion is such that the heat is distributed in a uniform and even manner throughout the oven, so that all parts of the baking-chamber are of equal heat, and the arrangement is also such that the heat is retained within the oven for a long time, so that a very material economy is effected in the use of fuel. Moreover, the rotatory plane or part on which the loaves are carried is located near the top of the baking-chamber, so that the steam and vapors given off from them do not rise above the articles being baked, but are merely diffused about them, so that the flavor is prevented from being lost during the baking operation.

The operative parts of the oven are of such a nature that very little power suffices to turn the plane or part on which the articles to be baked are carried, so that the device is capable of being very readily and quickly manipulated either during the baking operation or during the removal or insertion of the loaves within the oven.

From the above description it will be seen that the improved bake-oven constructed according to my invention is of an extremely simple and inexpensive nature and is especially well adapted for the purpose for which it is designed, and it will also be obvious from the above description that the device is capable of considerable modification without material departure from the principles and spirit of the invention, and for this reason I do not wish to be understood as limiting myself to the precise form and arrangement of the several parts of the device as herein set forth in carrying out my invention in practice. The bearing-plate 25 instead of being mounted on the upper end of the stirrup 23 direct can be mounted as shown in Fig. 9, in which the bearing-plate has a central hub to enter a hole therefor in the stirrup, and instead of having a separate flange on the upper bearing-plate encircling the lower end of the shaft this flange could be formed as a part of the upper bearing-plate 26, as shown in Fig. 9, the result, however, so far as furnishing a free bearing for the lower end of the shaft 18 being the same whether the construction of Fig. 7 or the construction of Fig. 9 is employed.

What I claim as new, and desire to secure by Letters Patent, is—

1. An oven having a baking-chamber, means for heating the same, a vertical shaft in said chamber, arms extended radially from the shaft and provided with depressions, plaster in said depressions and a covering for said arms held thereon by said plaster, substantially as set forth.

2. An oven having a baking-chamber, means for heating the same, a vertical shaft extended in said chamber, arms extended radially from the shaft, parts extended intermediate the outer ends of said arms, each of said arms and intermediate parts having a longitudinal flange and depressions, plaster in said depressions and a covering formed in sections held on said arms and intermediate parts between said longitudinal flanges, substantially as set forth.

3. An oven having a baking-chamber, means for heating the same, a vertical shaft in said chamber, driving means for said shaft, a plane for supporting articles to be baked and formed of a framework and a covering supported thereon, a collar on the shaft below said plane, diagonal braces extended from said collar up to said framework, a central collar on the shaft, and brace-rods having oppositely-screw-threaded ends, each such brace-rod having one end engaged with said central collar and its opposite end engaged with one of said diagonal braces, substantially as set forth.

4. An oven having a baking-chamber, means for heating the same, a vertical shaft extended in said chamber, a plane within the chamber and on said shaft, braces having their lower ends supported adjacent to the shaft and below said plane, said braces being extended upward with their upper portions inclined out from the shaft and arranged to support said plane and devices for drawing the inclined upper portions of the braces toward said shaft for raising said plane, substantially as set forth.

5. An oven having a baking-chamber, means for heating the same, a shaft extended in said chamber, arms extended radially from said shaft, a covering rested on said arms and forming a plane for supporting articles to be baked, means for driving said shaft and an annular part rested on said arms at the center of said plane and provided with a raised flange against which the covering of the device has engagement to hold said covering against displacement, said annular part being also provided with downwardly-extended portions having engagement between said arms to hold said annular part in position on the arms, substantially as set forth.

6. An oven having a baking-chamber, means for heating the same, a vertical shaft extended in said chamber, a plane within the chamber and on said shaft, braces having their lower ends supported adjacent to the shaft and below said plane and having their upper portions extended upward and inclined out from the shaft, a collar held on the shaft and brace-rods having their inner ends engaged with the collar and having at their outer ends adjustable connection with said inclined braces, substantially as set forth.

7. An oven having a baking-chamber, means for heating the same, a vertical shaft in the chamber, a plane on the shaft in the chamber, means for driving the shaft, the lower end of the shaft having a central recess and being provided with a flanged collar, an anchor-plate beneath the lower end of the shaft, a stirrup comprising upwardly-extended spaced arms produced on said anchor-plate, two correspondingly-grooved bearing-plates one above the other and provided with central openings alined with the central recess in the lower end of the shaft, the lower bearing-plate being rested on the stirrup and the flanged collar of the shaft being rested on and secured to the upper bearing-plate, balls interposed between the bearing-plates and engaged in the grooves thereof, a stud having its upper end engaged in the central recess in the lower end of the shaft, said stud being passed down through the central openings in the bearing-plates, the stirrup having a central bearing at its upper part in which the lower end of said stud is engaged and a screw carried by the stirrup with its upper end engaged under the lower end of said stud and its lower end formed with a head at the under side of the upper part of the stirrup and between the two arms thereof, substantially as set forth.

ANTON F. CHERNEY.

Witnesses:
 OSCAR W. BOND,
 WALKER BANNING.